US011026086B2

(12) United States Patent
Adrangi et al.

(10) Patent No.: US 11,026,086 B2
(45) Date of Patent: Jun. 1, 2021

(54) SYSTEMS, METHODS AND DEVICES FOR ADDING NON-PROVISIONED CELLULAR DEVICES TO A SUBSCRIPTION

(71) Applicant: Apple Inc., Cupertino, CA (US)

(72) Inventors: Farid Adrangi, Lake Oswego, OR (US); Ravikumar Balakrishnan, Hillsboro, OR (US); Zongrui Ding, Portland, OR (US); Mohammad Mamunur Rashid, Hillsboro, OR (US)

(73) Assignee: APPLE INC., Cupertino, CA (US)

( * ) Notice: Subject to any disclaimer, the term of this patent is extended or adjusted under 35 U.S.C. 154(b) by 482 days.

(21) Appl. No.: 16/074,389

(22) PCT Filed: Apr. 15, 2016

(86) PCT No.: PCT/US2016/027765
§ 371 (c)(1),
(2) Date: Jul. 31, 2018

(87) PCT Pub. No.: WO2017/180149
PCT Pub. Date: Oct. 19, 2017

(65) Prior Publication Data
US 2021/0058785 A1 Feb. 25, 2021

(51) Int. Cl.
*H04W 12/06* (2021.01)
*H04W 12/069* (2021.01)
(Continued)

(52) U.S. Cl.
CPC ......... *H04W 12/069* (2021.01); *H04L 9/0838* (2013.01); *H04L 9/0861* (2013.01);
(Continued)

(58) Field of Classification Search
CPC ......... H04W 12/0609; H04W 12/0401; H04W 12/00512; H04W 4/70; H04W 8/186;
(Continued)

(56) References Cited

U.S. PATENT DOCUMENTS

2013/0081113 A1 3/2013 Cherian et al.

FOREIGN PATENT DOCUMENTS

WO 2006085169 A1 8/2006
WO 2012042300 A1 4/2012

OTHER PUBLICATIONS

PCT/US2016/027765, International Search Report and Written Opinion, dated Jan. 16, 2017, 12 pages.

*Primary Examiner* — Joel Ajayi
(74) *Attorney, Agent, or Firm* — Stoel Rives LLP

(57) ABSTRACT

Non-pre-provisioned cellular Internet of things (IoT) devices can be added to an existing user's subscription with an operator and a service provider. The procedure can include obtaining a security association between a device and a user's smartphone using the operator's network. The operator and the service provider can verify the device with a certificate authority. In one embodiment, the smartphone reads (302) a URL pointer to the device certification and sends it (304) to the MME. The MME forwards (306) the URL to the HSS. The HSS verifies (312) the certificate and derives security credentials including the Master key K'. The HSS also derives another key K" used to establish security context between the IoT device and the smartphone. The device uses its key deriving function KDF with K' and Rand to generate K".

13 Claims, 11 Drawing Sheets

(51) Int. Cl.
*H04W 4/70* (2018.01)
*H04L 9/32* (2006.01)
*H04L 9/14* (2006.01)
*H04L 9/08* (2006.01)
*H04L 29/06* (2006.01)
*H04W 8/18* (2009.01)
*H04W 12/041* (2021.01)
*H04W 12/71* (2021.01)

(52) U.S. Cl.
CPC .............. *H04L 9/14* (2013.01); *H04L 9/3268* (2013.01); *H04L 63/0823* (2013.01); *H04L 63/0853* (2013.01); *H04W 4/70* (2018.02); *H04W 8/186* (2013.01); *H04W 12/041* (2021.01); *H04W 12/71* (2021.01)

(58) Field of Classification Search
CPC ....... H04L 9/0838; H04L 9/0861; H04L 9/14; H04L 9/3268; H04L 63/0823; H04L 63/0853
USPC ........................................................ 455/411
See application file for complete search history.

US 11,026,086 B2

SYSTEMS, METHODS AND DEVICES FOR ADDING NON-PROVISIONED CELLULAR DEVICES TO A SUBSCRIPTION

RELATED APPLICATIONS

This application is a national stage filing under 35 U.S.C. § 371 of International Patent Application No. PCT/US2016/027765, filed Apr. 15, 2016, which is hereby incorporated by reference herein in its entirety.

TECHNICAL FIELD

The present disclosure relates to cellular devices and more specifically to adding non-provisioned cellular devices in the field to an existing user's network operator's account and service provider's account.

DETAILED DESCRIPTION

Figure 1:
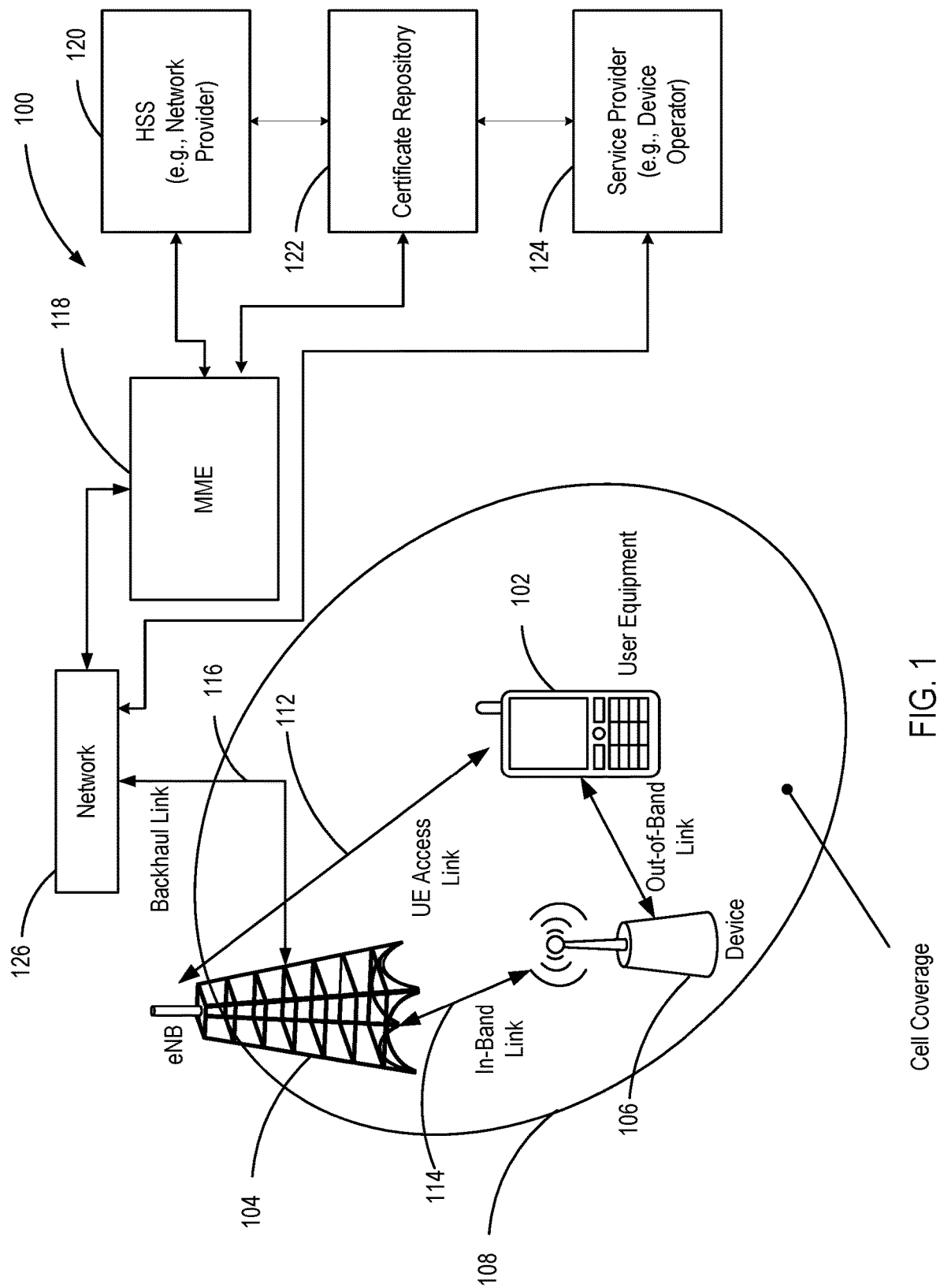
FIG. 1 is a diagram illustrating an activation system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus, and methods are disclosed that enable non-pre-provisioned cellular Internet of things (IoT) devices to be added to an existing user's subscription with an operator and a service provider. The procedure can include obtaining a security association between a device and a user's smartphone using the operator's network. The operator and the service provider can verify the device with a certificate authority.

Enabling a non-provisioned cellular device to become associated with a user account of a network operator and a service provide can enable usage scenarios like home automation (including, security, convenience, energy packages), industry automation, and smart cities with low-power devices (i.e., a battery life of several years). Such devices can be potentially easily installed and operated in challenging coverage conditions, e.g., indoors and basements.

These embodiments considers a non-pre-provisioned IoT device such that a customer (or account holder of a service provider) purchases a compliant and certified cellular IoT device, configured with a basic configuration, from a retailer. In some embodiments, a user is also assumed to have a smartphone provisioned with service to an operator and has an application provided by a service provider.

This system can perform authenticating and connecting qualified and/or authorized devices to a core network, for an end-to-end solution for adding a certified cellular IoT device to an existing service with the operator as well as to a customer account with a service provider. The service provider can have a business relationship with one or more cellular carriers (i.e., network operators). A carrier agnostic cellular IoT device can be added to a user's existing subscription and can be connected to a service provider via a supported cellular carrier.

This system introduces a unique way of combining service authorization with the cellular access network flow for efficiency. The system can protect the cellular network from malicious DOS attack. The system also uses techniques and technologies (like NFC) in the process of adding a carrier agnostic cellular IoT device (to a service provider account), which can result in a reduction of time, operations, and/or effort.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs), and/or Radio Network Controllers (RNCs) in an E-UTRAN, which communicate with a wireless communication device, known as user equipment (UE).

FIG. 1 is a diagram illustrating an activation system 100 that includes an out-of-band link between a UE 102 and a device 106. The activation system can include the UE 102, the device 106, an eNB 104, a certificate repository 122, a service provider 124, and a network 126 (which includes a mobility management entity (MME) 118 and a home subscriber server (HSS) 120 that are broken out for emphasis). Some embodiments may omit the out-of-band link between the UE 102 and the device 106.

In one embodiment, the UE 102 can help add the device 106 to a network operator account (e.g., a cellular provider) and then help add the device 106 to a service provider account (e.g., a device operator). The UE 102 receives a certificate URL over an out-of-band link (e.g., near field communication (NFC), BlueTooth™, BlueTooth™ Low Energy (BLE), Low Power Wi-Fi™, ZigBee™, Z-Wave™, etc.) from a non-provisioned device 106. The UE 102 transmits the URL to the eNB 104, which provides the URL to the MME 118 through the network 126. The MME 118 retrieves a certificate from the certificate repository 122 and verifies the certificate as valid. The MME 118 and/or the HSS 120 derive a key from information contained in a network operator account linked to the UE 102 (e.g., a network operator billing account for a user, etc.) and add the device 106 to the network operator account. The key is provided to the UE 102 over a UE access link 112, which relays the derived key to the device 106 over the out-of-band link. The device 106 can use this derived key to access the network over an in-band link 114.

The UE 102 can then provide the certificate URL and a device address to the service provider 124 with a request to add the device 106 to a service provider account. The service provider 124 retrieves a certificate from the certificate repository 122 and verifies the certificate as valid. The service provider 124 can then negotiate secure communications with the device 106 and add the device 106 to a service provider account associated with the UE 102 (e.g., a service provider billing account for the user, etc.).

A communication system can provide wireless communication services to a UE or other mobile wireless device. The system 100 includes a plurality of RANs (such as a RAN used by UE access link 112) through which the UE 102 may access IP services or other data services within a cell coverage 108, such as voice services or the Internet. Specifically, the system 100 can include a global system for mobile communications (GSM), enhanced data rates for GSM evolution (EDGE) RAN (GERAN), a UTRAN, and/or an E-UTRAN, which provide access to communication services through a core network 126. Each of the RANs operates according to a specific third generation partnership project (3GPP) RAT. For example, the GERAN implements GSM and/or EDGE RAT, the UTRAN implements universal mobile telecommunication system (UMTS) RAT or other 3GPP RAT, and the E-UTRAN implements LTE RAT. In some embodiments, the device 106 can communicate over narrowband (such as NarrowBand IoT in LTE including resource blocks within an LTE carrier or resource blocks in a LTE carrier guard band).

Each of the RANs includes one or more base stations or other infrastructure for wirelessly communicating with the UE 102 and providing access to communication services through network 126 connected by backhaul link 116. For example, the E-UTRAN includes one or more eNBs, which are configured to wirelessly communicate with the UE 102.

The core network 126 can include a serving gateway (SGW), a packet data network (PDN) gateway (PGW), an ANDSF server, an enhanced packet data gateway ePDG, the MME 118, and the HSS 120. In some embodiments, the core network 126 can comprise an Evolved Packet Core (EPC) network. The MME 118 and the HSS 120 are shown broken out from the core network 126 for ease of reference only.

Figure 2:
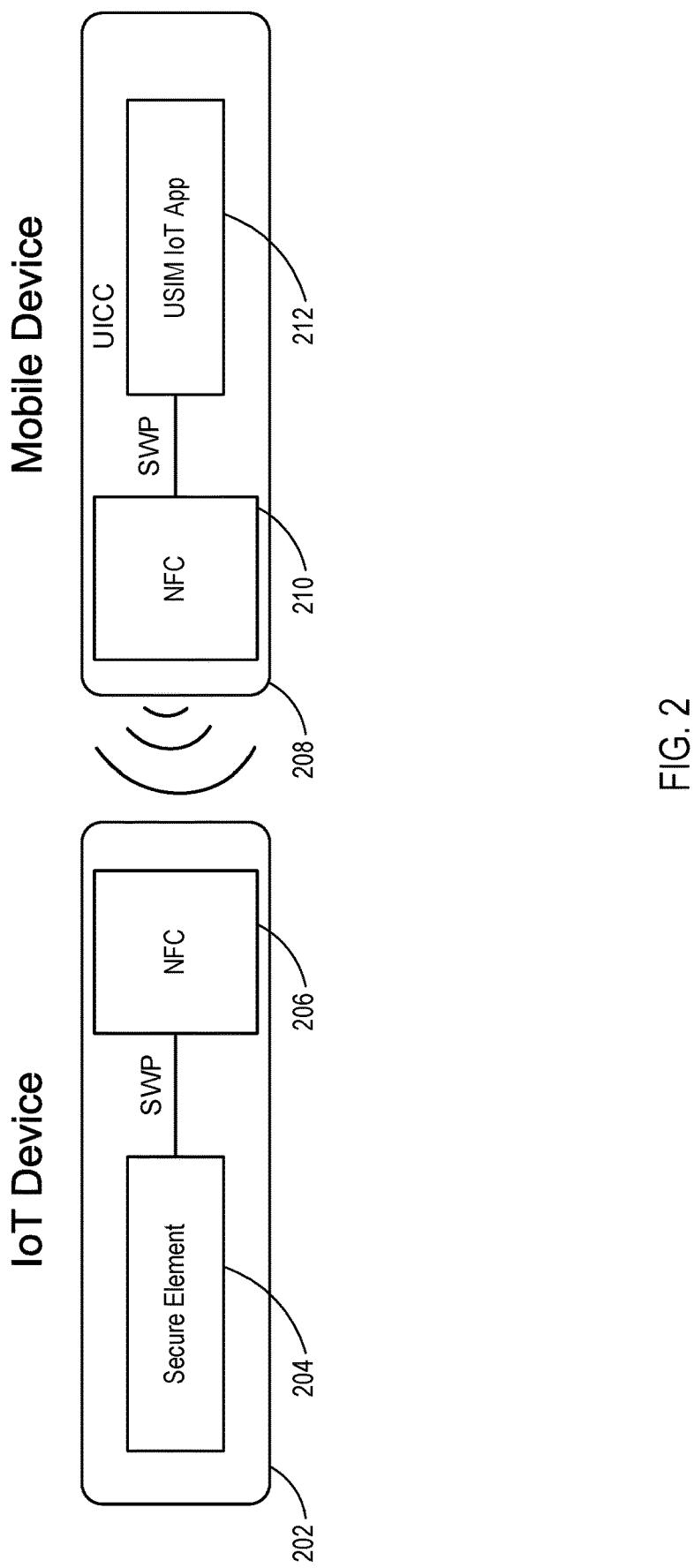
FIG. 2 is a block diagram illustrating an example of an out-of-band connection between a device and a mobile device consistent with embodiments disclosed herein.

FIG. 2 shows a block diagram illustrating an example of an out-of-band connection between a device and a mobile device. For example, an Internet of things (IoT) device 202 has a secure element 204, an NFC component 206, and an interface between the NFC component 206 and the secure element 204 (such as single wire protocol (SWP). The mobile device 208 can be a smartphone with a UICC (universal integrated circuit card) element containing universal subscriber identity module (USIM) IoT Application (App) 212 having an interface with an NFC component 210. It should be recognized that an out-of-band link can use other technologies, including near field communication (NFC), BlueTooth™, BlueTooth™ Low Energy (BLE), Low Power Wi-Fi™, ZigBee™, Z-Wave™, etc.

Figure 3:
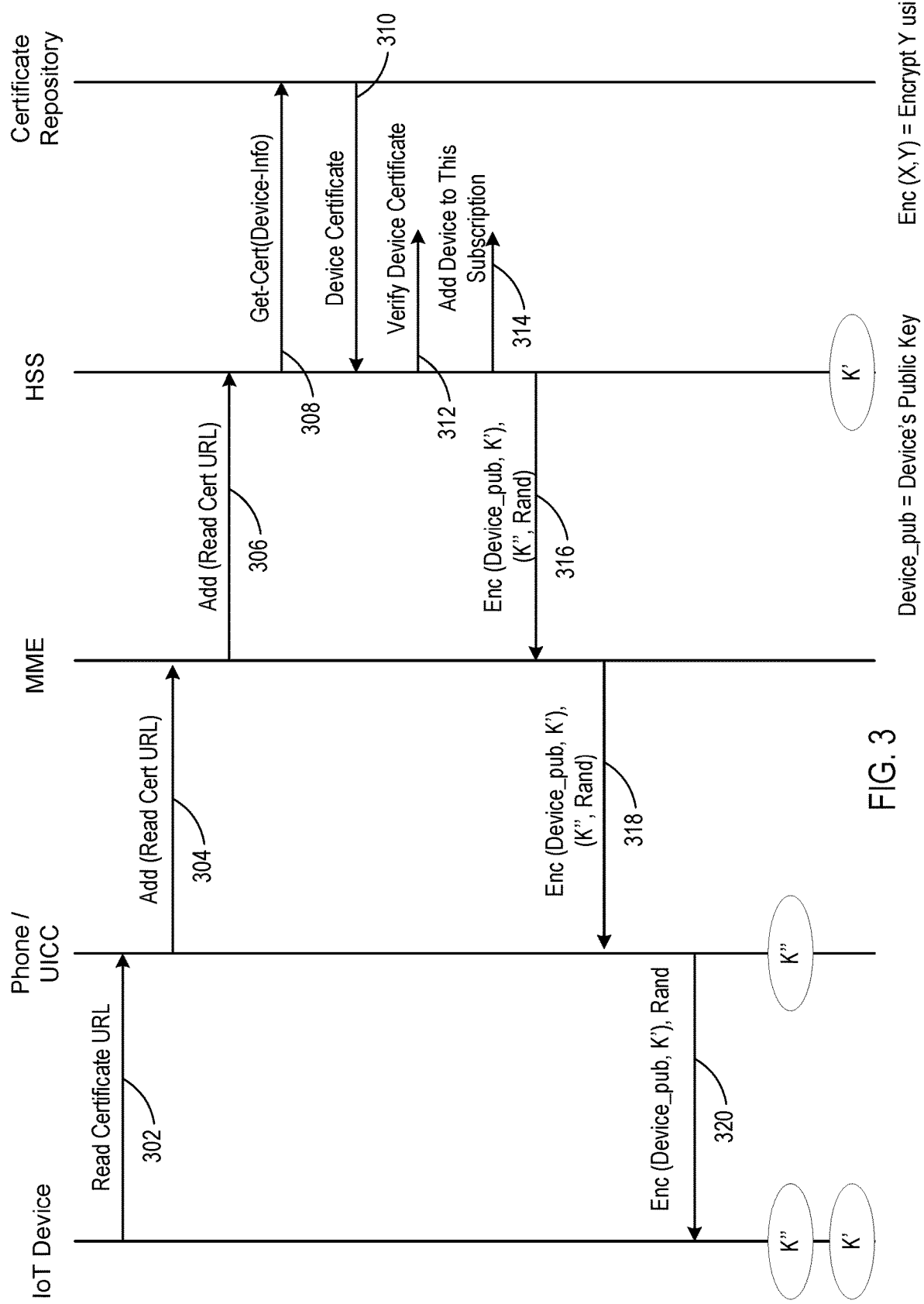
FIG. 3 is a process diagram illustrating a process of adding a device to a network account with out-of-band communication consistent with embodiments disclosed herein.
Figure 4:
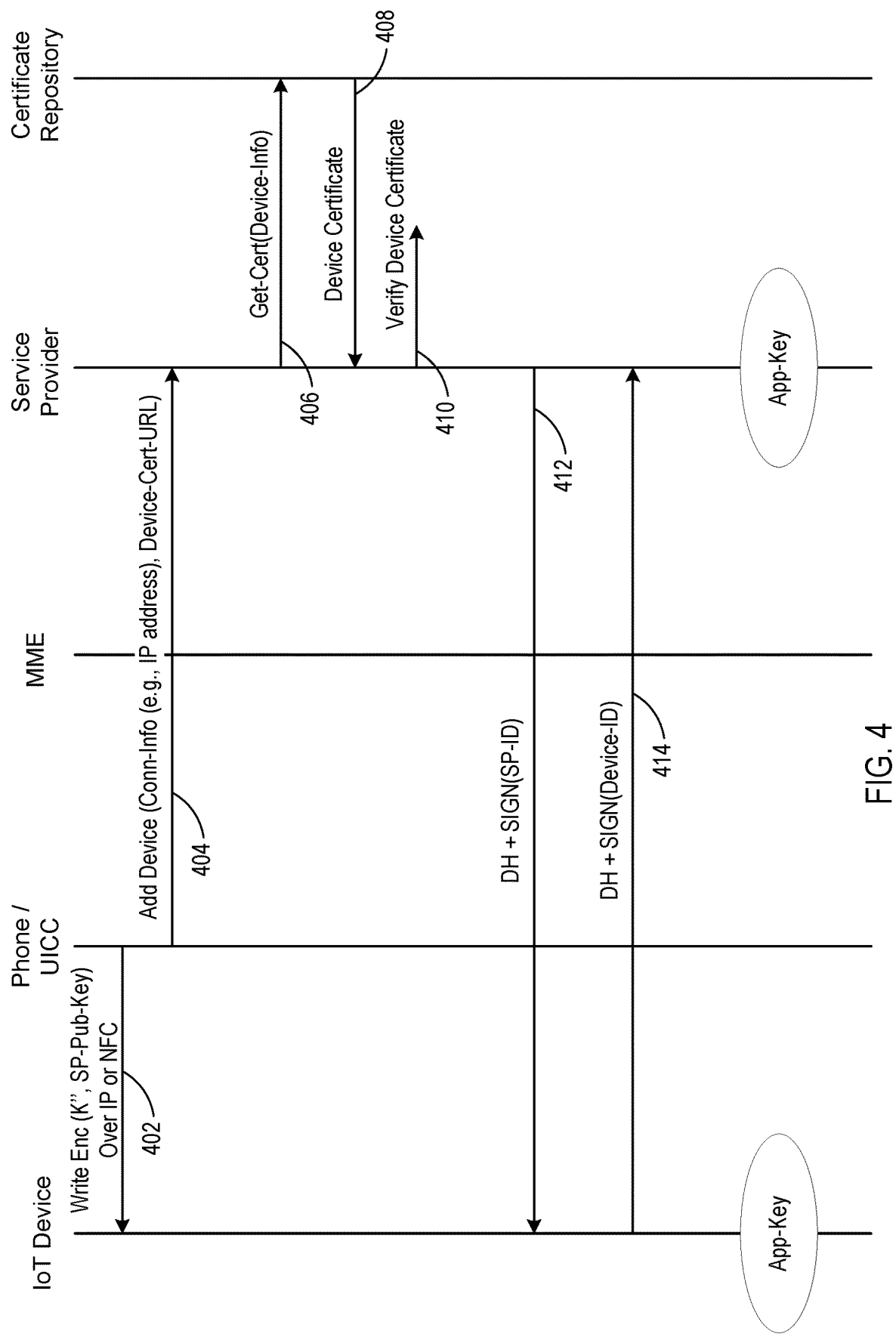
FIG. 4 is a process diagram illustrating a process of adding a device to a service provider account with out-of-band communication consistent with embodiments disclosed herein.

FIGS. 3 and 4 show a process for adding a non-provisioned device to a user account of a network operator and a service provider. FIG. 3 shows a process diagram illustrating a process of adding a device to a network account with out-of-band communication. The process can be divided into preconditions before the process, the process itself, and post conditions after the process. It should be recognized that operations shown in the figures are meant as an example and that ordering can be rearranged, some operations can be done in parallel, and/or some operations can be optional.

For example, several preconditions can be implemented before the process starts, such as the following preconditions: A cellular IoT device is configured with an appropriate device and security configuration by a device manufacturer. Device information can include device model, serial number, manufacturer ID, etc. Device security information can include a public/private pair of keys installed at manufacturing time and a URL to a web site containing the certificate chain for this device. The IoT device can include a secure programmable NFC operating in passive mode. This operation can be achieved by direct connection between an NFC circuit and a secure element, such as via SWP. The user's device (e.g., phone, tablet, PC, etc.) can include NFC radio capable of reading from and writing to a passive NFC tag. A service provider (such as a cloud service provider, sensor service provider, etc.) has a business relationship and/or agreement with one or more cellular carrier network providers. As part of this business agreement, a secure connection(s) can be established between the cellular network and the service provider. The secure connection(s) between the end-points can be achieved in a supervised manner. The cellular carrier network providers (also known as operators) can also have a trusted relationship with the certificate provider. The user has signed up and has an account with a service provider. The user has downloaded and installed the service provider application on his or her phone, tablet, or PC. The device includes a compliant and certified secure element to store critical security information. It should be recognized that not all preconditions must occur in all embodiments, but that different embodiments can use various preconditions selected from the above list or others not on the list.

In one embodiment, the process of adding a device to an existing user's subscription is shown in FIG. 3. In the example shown, the user launches the service provider application on his or her phone. The user is instructed to tap his or her phone on the IoT device to read 302 a URL pointer to the device certification and perhaps other information pertaining to device. The read URL is sent 304 from the user's phone to the MME. This transmission can be achieved in various ways. In one example, a Non-Access Stratum (NAS) message including "Service Request" or "NAS Uplink Container" can carry the URL to the MME. Functionality in the MME identifies the read URL and forwards 306 it to the HSS. This can be done using the existing Sha interface. For example, an Authentication Information Request message can be used. The HSS obtains 308 the device certificate from 310 the specified certificate URL. The HSS verifies 312 (e.g., is it valid, has it been revoked?) the chained certificate using its root of trust key. The obtained device certification may also include device serial number, device ID, manufacturer ID, etc.

The HSS can derive security credentials including the Master key K' (which in some embodiments is equivalent to Ki embedded in USIM), device identifiers for the operator's network (e.g., appending Device ID to IMSI), and information for the IoT device to connect to the operator's network. The HSS can add 304 the device to the user subscription associated with the phone.

The HSS can also derive another key K" that can be used to establish security context between the IoT device and the user's phone. This can be used when the phone securely communicates with the IoT device. K" is derived using a key derivation function with K' and Rand as parameters represented by K"=KDF(K', Rand).

After verifying the device and preparing for device attach, the HSS encrypts K' with the device's public key provided by the service provider and sends 318 it to the phone along with key K" and Rand. This can be done using 316 the existing Sha interface between the HSS and the MME and the NAS Downlink transport messages between the MME and the user.

The user taps the phone with the device to send 320 the encrypted K' key and Rand to the device. The device decrypts K' and uses its key deriving function (KDF) with K' and Rand to generate K". The device has credentials enabling the device to connect to the operator's network. In addition, there is also a security association between device and the user's phone using K".

FIG. 4 shows a process diagram illustrating a process of adding a device to a service provider with out-of-band communication. In some embodiments, the service provider is a third-party service provider. For example, the user's phone uses the service provider application to encrypt the service provider's public key (SP-Pub-key) with K" and sends 402 to the device either using NFC or over the Internet. The phone uses the service provider application to also send 404 the connection information (such as the IP address of the device) and the device certification URL. The service provider obtains 406 the device certificate from the specified URL. The service provider verifies 410 (e.g., is it valid, has it been revoked?) the certificate using the root of trust key. The service provider and the device utilize their device ID and service provider ID respectively to perform 412 and 414 a Diffie-Hellman procedure to exchange an application layer security key. The device is successfully added to the service provider's account. There is also a security association established between the service provider and the device for application layer security.

In an example, some post conditions can be implemented and/or verified. The cellular IoT device is added to the user's subscription with the operator. The user can see the cellular IoT device is listed by the service provider application (such as under "paired devices"). The user is able to receive notifications and control the device remotely. It should be recognized that not all post conditions must occur in all embodiments, but that different embodiments can use various preconditions selected from the above list or others not on the list.

Figure 5:
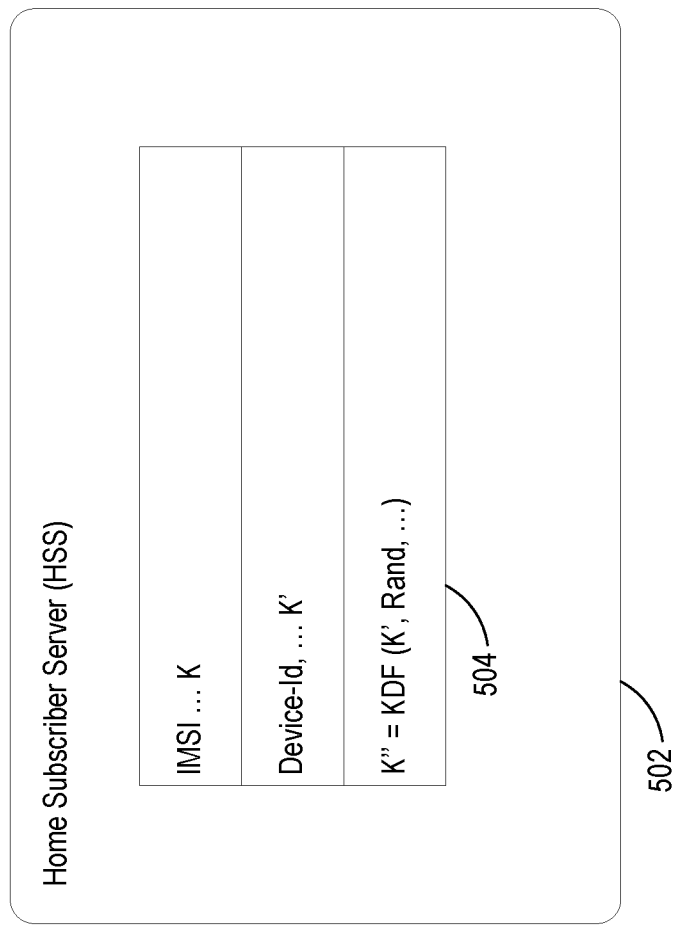
FIG. 5 is a block diagram of a home subscriber server consistent with embodiments disclosed herein.

FIG. 5 shows a block diagram of a home subscriber server (HSS) 502 and data 504 stored within the HSS. In one embodiment, the HSS stores an international mobile subscriber identity (IMSI) and a key K that is tied to the identity (such as for a smartphone). The key K can be used to derive a derived key K' for use with a non-provisioned device (such as an IoT device). In some embodiments, a derivation of K' uses both K and a device-ID of the non-provisioned device. A second derived key K" can be derived from K'. In some embodiments, K" is derived using a key derivation function, K' and a random seed. The HSS can store K, K', and K", as well as the other data including the IMSI, device-ID, random seed, etc.

Figure 6:
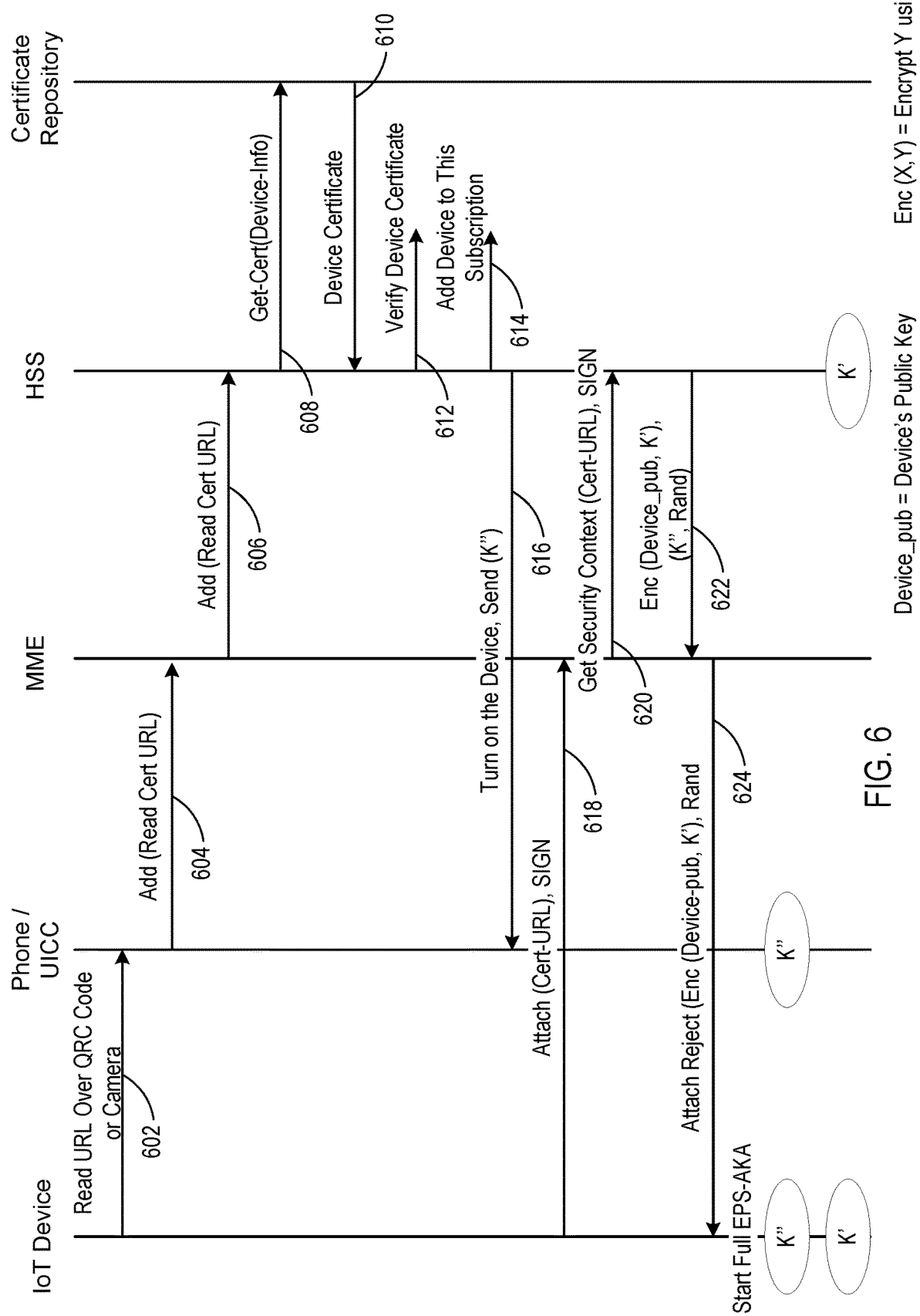
FIG. 6 is a process diagram illustrating a process of adding a device to a network account without out-of-band communication consistent with embodiments disclosed herein.
Figure 7:
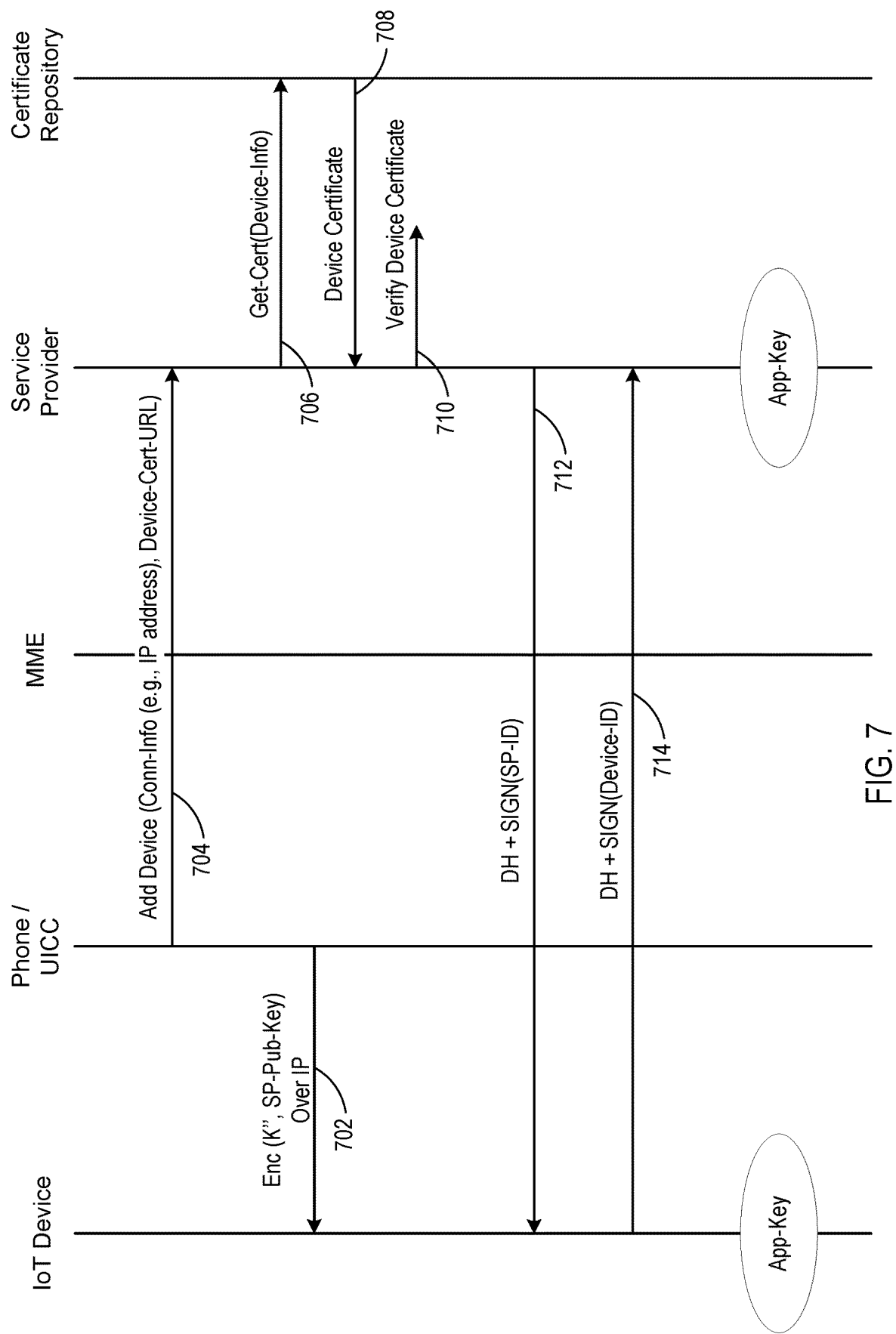
FIG. 7 is a process diagram illustrating a process of adding a device to a service provider account without out-of-band communication consistent with embodiments disclosed herein.

FIGS. 6 and 7 show a process for adding a non-provisioned device to a user account of a network operator and a service provider without an out-of-band transmission. FIG. 6 shows a process diagram illustrating a process of adding a device to a network account without an out-of-band communication. The process can be divided into preconditions before the process, the process itself, and post conditions after the process. It should be recognized that operations shown in the figures are meant as an example and that ordering can be rearranged, some operations can be done in parallel, and/or some operations can be optional. In some embodiments, the process flow can be similar to the out-of-band process except that two-way communication between the service provider and the device through the phone is not possible due to an absence of direct communication between the phone and the device.

For example, several preconditions can be implemented before the process starts, such as the following preconditions: A cellular device is configured with an appropriate device and security configuration by a device manufacturer. Device information can include device model, serial number, manufacturer ID, etc. Device security information can include a public/private keypair configured at the manufacturing time. A URL pointing to the web site that has the certificate chain for this device can be provided with the device. In one embodiment, a QR code printed on the device is a URL pointing to the web site that has the certificate chain for this device.

A service provider (such as a cloud service provider, sensor service provider, etc.) has a business relationship and/or agreement with one or more cellular carrier network providers. As part of this business agreement, a secure connection(s) can be established between the cellular network and the service provider. The secure connection(s) between the end-points can be achieved in a supervised manner. The cellular carrier network providers can also have a trusted relationship with the certificate provider. The user has signed up and has an account with a service provider. The user has downloaded and installed the service provider application on his or her phone, tablet, or PC. The device includes a compliant and certified secure element to store critical security information. It should be recognized that not all preconditions must occur in all embodiments, but that different embodiments can use various preconditions selected from the above list or others not on the list.

In one embodiment, the process of adding a device to an existing user's cellular subscription is shown in FIG. 6. In the example shown, the user launches the service provider application on his or her smartphone. The user uses the phone to read 602 the QR code or manually types the URL (which can also be printed on the device). The read URL is sent 604 from the user's phone to the MME. This can be achieved in various ways. For example, the NAS message including "Service Request" or "NAS Uplink Container" can be used to provide the URL to the MME. Functionality in the MME identifies the read URL and forwards 606 it to the HSS. This can be done using an existing Sha interface.

For example, the Authentication Information Request message can be used. The HSS obtains 608 and 610 the device certificate from the specified certificate URL. The HSS verifies 612 (e.g., is it valid, has it been revoked?) the chained certificate using its root of trust key. The obtained device certification may also include device serial number, device ID, manufacturer ID, etc.

The HSS can derive the security credentials including a Master key K' (equivalent to Ki embedded in USIM), device identifiers for the operator's network (e.g., appending Device ID to IMSI), and information for the IoT device to connect to the operator's network. The HSS can also derive another key K" that can be used to establish security context between an IoT device and the user's phone. This can be used later when the phone securely communicates with the IoT device.

After verifying the device and preparing for device attach, the HSS notifies 616 the user to turn on the IoT device (through the phone) as well as send key K" to the phone. This can be done using the existing Sha interface between the HSS and the MME and the NAS Downlink transport messages between the MME and the phone. The user of the phone turns on the IoT device, which in turn sends 618 an Attach Request message with the URL for the device's certificate and a unique signature SIGN. MME functionality can identify the fields in the Attach Request message and sends 620 a message to the HSS including a request for the device's security context and SIGN. The HSS encrypts the Master key K' with the device's public key and sends 622 it to MME along with a random number parameter and assigned IMSI (or equivalent ID). The MME issues 624 an Attach Reject message to the device but also includes the encrypted version of K' along with Rand and IMSI (or equivalent ID) in the message. The IoT device uses K' and Rand and derives the key K" using its KDF. At the end of the phase, the device has credentials to start a normal attach and connect to the network, such as through an evolved packet system authentication and key agreement (EPS AKA). Further, the device also has a security association with the user's phone.

FIG. 7 shows a process diagram illustrating a process of adding a device to a service provider with out-of-band communication. In some embodiments, the service provider is a third-party service provider. For example, with the IoT device connected to the operator's network, the phone can encrypt the service provider's public key with K" and send 702 it to the IoT device over an Internet or network connection. In some embodiments, this transfer can be done using a service provider application on the phone. The phone can use the service provider application to also send 704 the connection information (such as the IP address of the device) and the device certification URL to the service provider. The service provider obtains the device certificate 706 and 708 from the specified URL of the certificate repository. The service provider verifies 710 (e.g., is it valid, has it been revoked?) the certificate using the root of trust key. The service provider and the IoT device utilize a device ID and service provider ID respectively to perform 712 and 714 a Diffie-Hellman procedure to exchange an application layer security key.

In an example, some post conditions can be implemented and/or verified. The cellular IoT device is added to the user's subscription with the operator. The user can see the cellular IoT device is listed by the service provider application (such as under "paired devices"). The user is able to receive notifications and control the device remotely. It should be recognized that not all post conditions must occur in all embodiments, but that different embodiments can use various preconditions selected from the above list or others not on the list.

Figure 8:
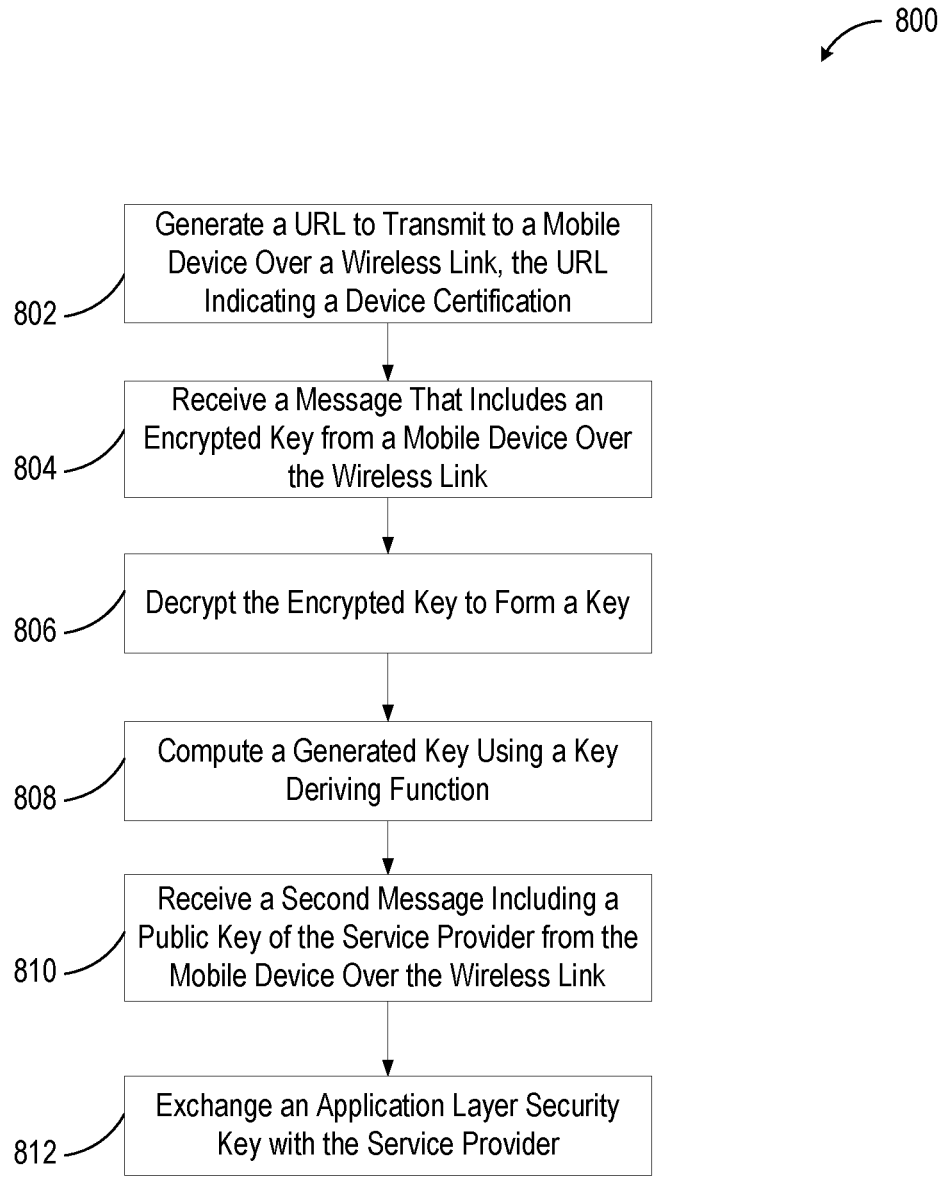
FIG. 8 is a flow chart illustrating a method for adding a cellular device to a subscription consistent with embodiments disclosed herein.

FIG. 8 shows a method 800 for adding a cellular device to a subscription. The method can be accomplished by the systems described herein, including the systems shown in connection with FIG. 1, including the UE 102, device 106, eNB 104, MME 118, HHS 120, certificate repository 122, and service provider 124. In block 802, the device generates a URL to transmit to a mobile device over a wireless link, the URL indicating a device certification. In block 804, the device receives a message that includes an encrypted key from a mobile device over the wireless link. In block 806, the device decrypts the encrypted key to form a key. In block 808, the device computes a generated key using a key-deriving function. In block 810, the device receives a second message including a public key of the service provider from the mobile device over the wireless link. In block 812, the device exchanges an application layer security key with the service provider.

Example embodiments can include a non-provisioned device with NFC and a non-provisioned device without NFC. A first deployment model that includes a non-provisioned device and NFC can include the following: A mechanism by which the cellular IoT device is added to an existing user's subscription with the operator. A mechanism by which the operator is enabled to provision and configure the device by transferring the device, network, and security information to the device via NFC onto a connected device such as a smartphone. A mechanism for the operator to establish a security association between the device and the smartphone for communication over NFC and the Internet. A mechanism by which a service provider is enabled to provision and configure the device by transferring necessary information to the device via NFC/Internet from the smartphone for enabling application layer security between the device and a service provider. A mechanism by which the service provider can securely verify the integrity of the device and whether it is a certified and compliant cellular IoT device. A mechanism by which a service provider can securely verify the integrity of the device and whether it is a certified and compliant cellular IoT device.

A second deployment model that includes a non-provisioned device without NFC can include the following: the recitations above describing the first deployment model. A mechanism by which the service provider is enabled to provision and configure the device by transferring the device, network, and security information to the device through the carrier network. A mechanism by which the operator uses the attach procedure to transfer the security material to the IoT device to derive the security association between the IoT device and a smartphone. A mechanism by which the service provider can securely verify the integrity of the device and whether it is a certified and compliant cellular IoT device.

Figure 9:
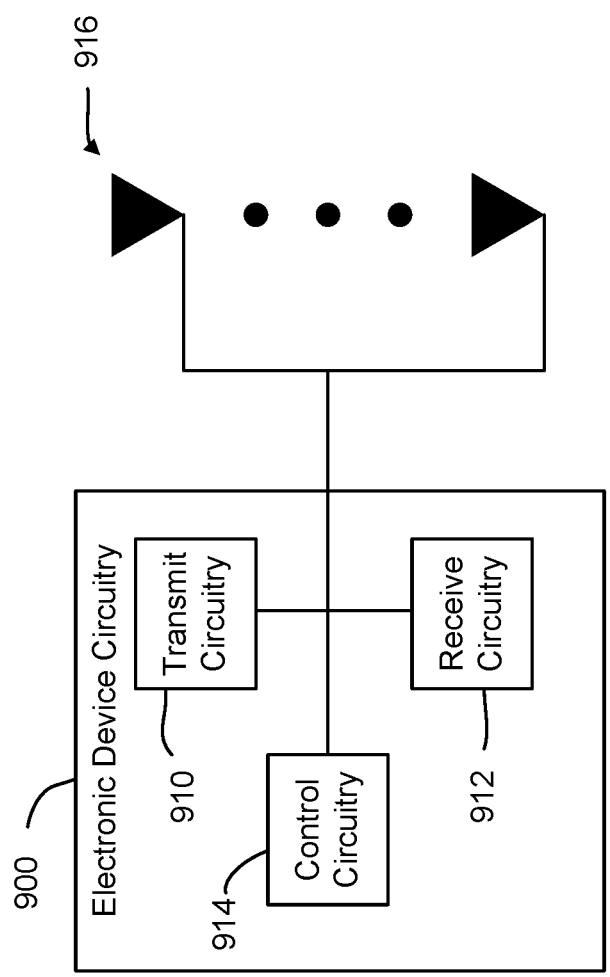
FIG. 9 is a block diagram illustrating electronic circuitry for an enhanced node B (eNB) consistent with embodiments disclosed herein.

FIG. 9 is a block diagram illustrating electronic circuitry that may be eNB circuitry, UE circuitry, network node circuitry, or some other type of circuitry in accordance with various embodiments. In embodiments, the electronic device circuitry 900 may be, or may be incorporated into or otherwise a part of, an eNB, a UE, a mobile station (MS), a BTS, a network node, or some other type of electronic device. In embodiments, the electronic device circuitry 900 may include radio transmit circuitry 910 and receive circuitry 912 coupled to control circuitry 914. In embodiments, the transmit circuitry 910 and/or receive circuitry 912 may be elements or modules of transceiver circuitry, as shown.

The electronic device circuitry 910 may be coupled with one or more plurality of antenna elements 916 of one or more antennas. The electronic device circuitry 900 and/or the components of the electronic device circuitry 900 may be configured to perform operations similar to those described elsewhere in this disclosure.

In embodiments where the electronic device circuitry 900 is or is incorporated into or otherwise part of a UE, the transmit circuitry 910 can transmit the certificate URL as shown in FIG. 3. The receive circuitry 912 can receive the encrypted key K' as shown in FIG. 3.

In embodiments where the electronic device circuitry 900 is an eNB, BTS and/or a network node, or is incorporated into or is otherwise part of an eNB, BTS and/or a network node, the transmit circuitry 910 can transmit the encrypted key K' on behalf of the MME as shown in FIG. 3. The receive circuitry 912 can receive the certificate URL on behalf of the MME as shown in FIG. 3.

In certain embodiments, the electronic device circuitry 900 shown in FIG. 9 is operable to perform one or more methods, such as the methods shown in FIG. ___.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 10:
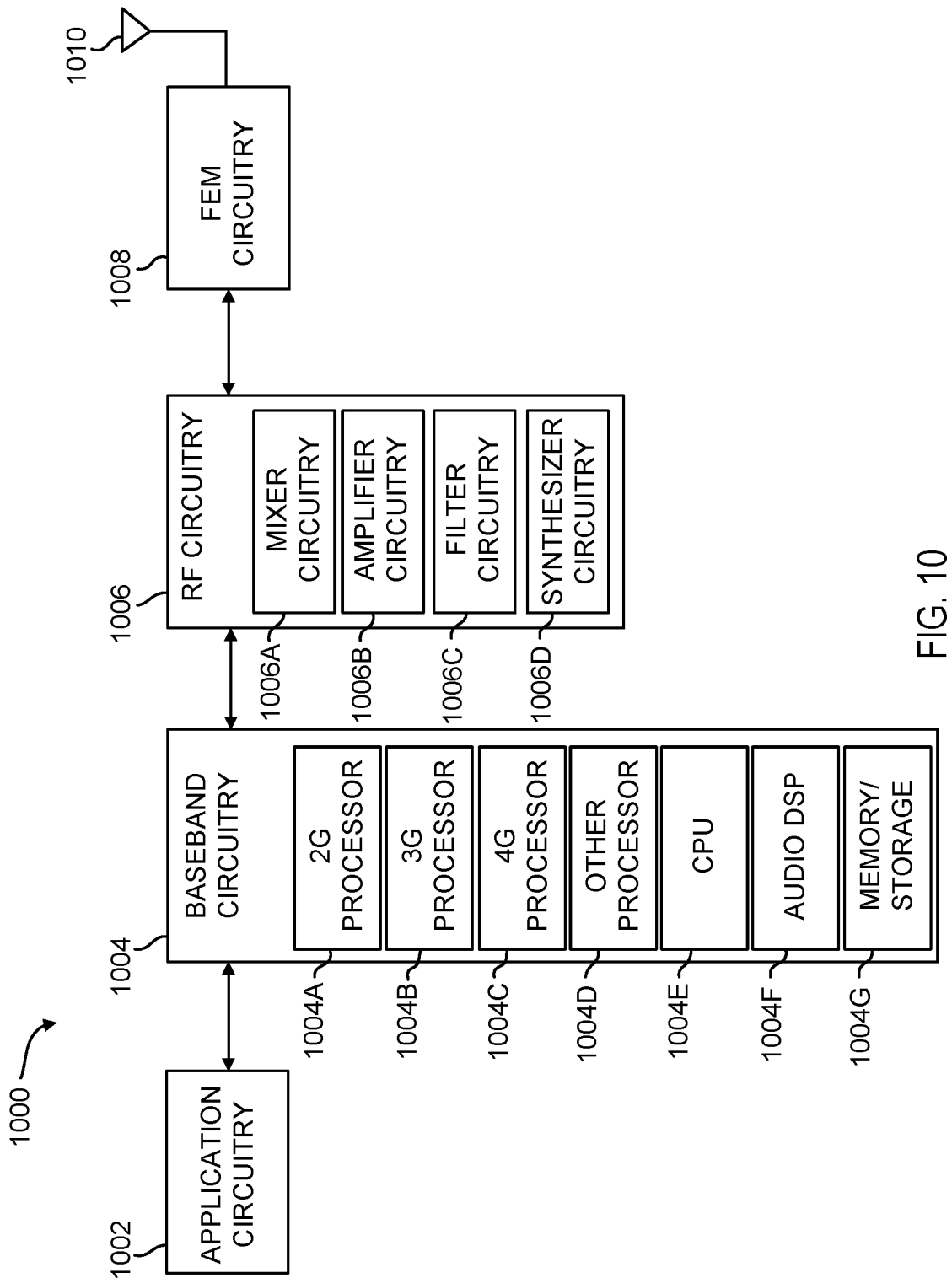
FIG. 10 is a block diagram illustrating electronic components of a user equipment (UE) or mobile station (MS) consistent with embodiments disclosed herein.

Embodiments described herein may be implemented into a system using any suitably configured hardware and/or software. FIG. 10 is a block diagram illustrating, for one embodiment, example components of a user equipment (UE) or mobile station (MS) device 1000. In some embodiments, the UE device 1000 may include application circuitry 1002, baseband circuitry 1004, Radio Frequency (RF) circuitry 1006, front-end module (FEM) circuitry 1008, and one or more antennas 1010, coupled together at least as shown in FIG. 10.

The application circuitry 1002 may include one or more application processors. By way of non-limiting example, the application circuitry 1002 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 1004 may include one or more single-core or multi-core processors. The baseband circuitry 1004 may include one or more baseband processors and/or control logic. The baseband circuitry 1004 may be configured to process baseband signals received from a receive signal path of the RF circuitry 1006. The baseband 1004 may also be configured to generate baseband signals for a transmit signal path of the RF circuitry 1006. The baseband processing circuitry 1004 may interface with the application circuitry 1002 for generation and processing of the baseband signals, and for controlling operations of the RF circuitry 1006.

By way of non-limiting example, the baseband circuitry 1004 may include at least one of a second generation (2G) baseband processor 1004A, a third generation (3G) baseband processor 1004B, a fourth generation (4G) baseband processor 1004C, other baseband processor(s) 1004D for other existing generations, and generations in development or to be developed in the future (e.g., fifth generation (5G), 6G, etc.). The baseband circuitry 1004 (e.g., at least one of baseband processors 1004A-1004D) may handle various radio control functions that enable communication with one or more radio networks via the RF circuitry 1006. By way of non-limiting example, the radio control functions may include signal modulation/demodulation, encoding/decoding, radio frequency shifting, other functions, and combinations thereof. In some embodiments, modulation/demodulation circuitry of the baseband circuitry 1004 may be programmed to perform Fast-Fourier Transform (FFT), precoding, constellation mapping/demapping functions, other functions, and combinations thereof. In some embodiments, encoding/decoding circuitry of the baseband circuitry 1004 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 1004 may include elements of a protocol stack. By way of non-limiting example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004E of the baseband circuitry 1004 may be programmed to run elements of the protocol stack for signaling of the PHY, MAC, RLC, PDCP and/or RRC layers. In some embodiments, the baseband circuitry 1004 may include one or more audio digital signal processor(s) (DSP) 1004F. The audio DSP(s) 1004F may include elements for compression/decompression and echo cancellation. The audio DSP(s) 1004F may also include other suitable processing elements.

The baseband circuitry 1004 may further include memory/storage 1004G. The memory/storage 1004G may include data and/or instructions for operations performed by the processors of the baseband circuitry 1004 stored thereon. In some embodiments, the memory/storage 1004G may include any combination of suitable volatile memory and/or non-volatile memory. The memory/storage 1004G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 1004G may be shared among the various processors or dedicated to particular processors.

Components of the baseband circuitry 1004 may be suitably combined in a single chip, a single chipset, or disposed on a same circuit board in some embodiments. In some embodiments, some or all of the constituent components of the baseband circuitry 1004 and the application circuitry 1002 may be implemented together, such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

The RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. The RF circuitry 1006 may include a receive signal path which may include circuitry to down-convert RF signals received from the FEM circuitry 1008, and provide baseband signals to the baseband circuitry 1004. The RF circuitry 1006 may also include a transmit signal path which may include circuitry to up-convert baseband signals provided by the baseband circuitry 1004, and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006A, amplifier circuitry 1006B, and filter circuitry 1006C. The transmit signal path of the RF circuitry 1006 may include filter circuitry 1006C and mixer circuitry 1006A. The RF circuitry 1006 may further include synthesizer circuitry 1006D configured to synthesize a frequency for use by the mixer circuitry 1006A of the receive signal path and the transmit signal path. In some embodiments, the mixer circuitry 1006A of the receive signal path may be configured to down-convert RF signals received from the FEM circuitry 1008 based on the synthesized frequency provided by synthesizer circuitry 1006D. The amplifier circuitry 1006B may be configured to amplify the down-converted signals.

The filter circuitry 1006C may include a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may include zero-frequency baseband signals, although this is not a requirement. In some embodiments, the mixer circuitry 1006A of the receive signal path may comprise passive mixers, although the scope of the embodiments is not limited in this respect.

In some embodiments, the mixer circuitry 1006A of the transmit signal path may be configured to up-convert input baseband signals based on the synthesized frequency provided by the synthesizer circuitry 1006D to generate RF output signals for the FEM circuitry 1008. The baseband signals may be provided by the baseband circuitry 1004 and may be filtered by filter circuitry 1006C. The filter circuitry 1006C may include a low-pass filter (LPF), although the scope of the embodiments is not limited in this respect. In some embodiments, the mixer circuitry 1006A of the receive signal path and the mixer circuitry 1006A of the transmit signal path may include two or more mixers, and may be arranged for quadrature downconversion and/or upconversion, respectively. In some embodiments, the mixer circuitry 1006A of the receive signal path and the mixer circuitry 1006A of the transmit signal path may include two or more mixers and may be arranged for image rejection (e.g., Hartley image rejection). In some embodiments, the mixer circuitry 1006A of the receive signal path and the mixer circuitry 1006A may be arranged for direct downconversion and/or direct upconversion, respectively. In some embodiments, the mixer circuitry 1006A of the receive signal path and the mixer circuitry 1006A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In such embodiments, the RF circuitry 1006 may include analog-to-digital converter (ADC) and digital-to-analog converter (DAC) circuitry, and the baseband circuitry 1004 may include a digital baseband interface to communicate with the RF circuitry 1006.

In some dual-mode embodiments, separate radio IC circuitry may be provided for processing signals for each spectrum, although the scope of the embodiments is not limited in this respect.

In some embodiments, the synthesizer circuitry 1006D may include one or more of a fractional-N synthesizer and a fractional N/N+1 synthesizer, although the scope of the embodiments is not limited in this respect as other types of frequency synthesizers may be suitable. For example, synthesizer circuitry 1006D may include a delta-sigma synthesizer, a frequency multiplier, a synthesizer comprising a phase-locked loop with a frequency divider, other synthesizers and combinations thereof.

The synthesizer circuitry 1006D may be configured to synthesize an output frequency for use by the mixer circuitry 1006A of the RF circuitry 1006 based on a frequency input and a divider control input. In some embodiments, the synthesizer circuitry 1006D may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

The synthesizer circuitry 1006D of the RF circuitry 1006 may include a divider, a delay-locked loop (DLL), a multiplexer and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 1006D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

The FEM circuitry 1008 may include a receive signal path which may include circuitry configured to operate on RF signals received from one or more antennas 1010, amplify the received signals, and provide the amplified versions of the received signals to the RF circuitry 1006 for further processing. The FEM circuitry 1008 may also include a transmit signal path which may include circuitry configured to amplify signals for transmission provided by the RF circuitry 1006 for transmission by at least one of the one or more antennas 1010.

In some embodiments, the FEM circuitry 1008 may include a TX/RX switch configured to switch between a transmit mode and a receive mode operation. The FEM circuitry 1008 may include a receive signal path and a transmit signal path. The receive signal path of the FEM circuitry 1008 may include a low-noise amplifier (LNA) to amplify received RF signals and provide the amplified received RF signals as an output (e.g., to the RF circuitry 1006). The transmit signal path of the FEM circuitry 1008 may include a power amplifier (PA) configured to amplify input RF signals (e.g., provided by RF circuitry 1006), and one or more filters configured to generate RF signals for subsequent transmission (e.g., by one or more of the one or more antennas 1010.

In some embodiments, the MS device 1000 may include additional elements such as, for example, memory/storage, a display, a camera, one of more sensors, an input/output (I/O) interface, other elements, and combinations thereof.

In some embodiments, the MS device 1000 may be configured to perform one or more processes, techniques, and/or methods as described herein, or portions thereof.

Figure 11:
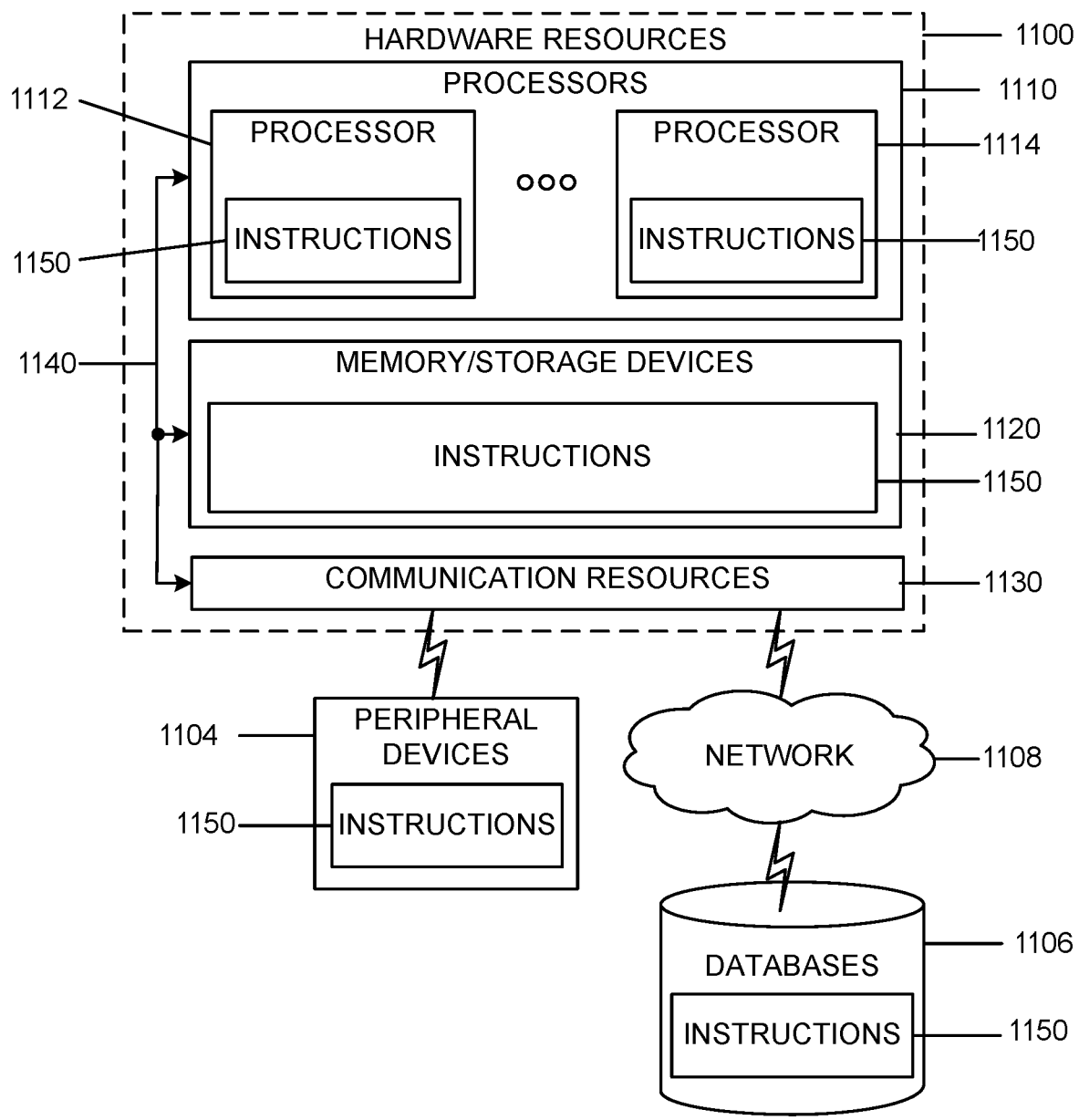
FIG. 11 is a schematic diagram of a computing system consistent with embodiments disclosed herein.

FIG. 11 is a schematic diagram of computing system including components, according to some example embodiments, able to read instructions from a machine-readable or computer-readable medium (e.g., a machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which are communicatively coupled via a bus 1140.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114. The memory/storage devices 1120 may include main memory, disk storage, or any suitable combination thereof.

The communication resources 1130 may include interconnection and/or network interface components or other suitable devices to communicate with one or more peripheral devices 1104 and/or one or more databases 1106 via a network 1108. For example, the communication resources 1130 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 and/or the databases 1106. Accordingly, the memory of processors 1110, the memory/storage devices 1120, the peripheral devices 1104, and the databases 1106 are examples of computer-readable and machine-readable media.

EXAMPLES

The following examples pertain to further embodiments.

Example 1 is an apparatus of a cellular device. The apparatus includes a processor. The processor is configured to generate a Uniform Resource Locator (URL) to transmit to a mobile device over a wireless link, the URL indicating a device certification. The processor can further receive a message that includes an encrypted key from a mobile device over the wireless link, and decrypt the encrypted key to form a key. The processor can further compute a generated key using a key-deriving function, receive a second message including a public key of a service provider from the mobile device over the wireless link, and exchange an application layer security key with the service provider.

In Example 2, the subject matter of Example 1 or any of the Examples described herein may further include a secure element configured to store the key and the generated key. The subject matter can further include a wireless interface configured to communicate with a mobile device.

In Example 3, the subject matter of Example 1 or any of the Examples described herein may further include a URL which contains data describing the cellular device.

In Example 4, the subject matter of Example 1 or any of the Examples described herein may further include a processor configured to provision the cellular device for a network provider with device, network, and security information.

In Example 5, the subject matter of Example 1 or any of the Examples described herein may further include a processor configured to provision the cellular device for a service provider with the application layer security key.

In Example 6, the subject matter of Example 1 or any of the Examples described herein may further include a processor configured to verify an integrity of the device, whether the device is compliant to a set of standards or whether the device is certified by an entity.

In Example 7, the subject matter of any of Examples 1-6 or any of the Examples described herein may further include a wireless link near field communication (NFC), Bluetooth™ Low Energy, low power Wi-Fi™, or ZigBee™.

In Example 8, the subject matter of any of Examples 1-6 or any of the Examples described herein may further include a cellular device configured to communicate over long term evolution (LTE) narrowband.

In Example 9, the subject matter of any of Examples 1-6 or any of the Examples described herein may further include a processor configured to decrypt the second message with the generated key.

In Example 10, the subject matter of any of Examples 1-6 or any of the Examples described herein may further include where exchanging the application layer security key with the service provider includes performing a Diffie-Hellman procedure to exchange the application layer security key.

In Example 11, the subject matter of any of Examples 1-6 or any of the Examples described herein may further include a baseband processor.

Example 12 is an apparatus of a user equipment (UE). The apparatus includes a processor. The processor is configured to receive a Uniform Resource Locator (URL) from a long term evolution (LTE) device over a wireless link, the URL indicating a device certification, generate a first message with the URL to transmit to a network, and receive an encrypted network key and an encrypted device key from the network. The processor is further configured to decrypt the encrypted network key to form a network key, the network key used for securing communications between the LTE device and the network. The processor can also decrypt the encrypted device key to form a device key, the derived key used for securing communications between the LTE device and the UE. The processor can further generate a second message including the network key to transmit to the LTE device, generate a third message including a public key of the service provider to provide to the LTE device, and generate a fourth message including LTE device connection information and device certification to transmit to the service provider.

In Example 13, the subject matter of Example 12 or any of the Examples described herein may further include a wireless interface configured to communicate with the LTE device and execute an application configured to communicate with the LTE device.

In Example 14, the subject matter of Example 12 or any of the Examples described herein may further include where generating a message with the URL to transmit to the network includes transmitting the first message to a mobility management entity (MME).

In Example 15, the subject matter of Example 12 or any of the Examples described herein may further include where the first message includes a service request or a Non-Access Stratum (NAS) Uplink Container.

In Example 16, the subject matter of Example 12 or any of the Examples described herein may further include where the URL includes data describing the cellular device.

In Example 17, the subject matter of any of Examples 12-16 or any of the Examples described herein may further include where the wireless link is near field communication, Bluetooth™ Low Energy, low power Wi-Fi™, or ZigBee™.

In Example 18, the subject matter of any of Examples 12-16 or any of the Examples described herein may further include where the LTE device is configured to communicate over LTE narrowband.

In Example 19, the subject matter of any of Examples 12-16 or any of the Examples described herein may further include where the processor is configured to decrypt the second message with the generated key.

In Example 20, the subject matter of any of Examples 12-16 or any of the Examples described herein may further include where exchanging the application layer security key with the service provider includes performing a Diffie-Hellman procedure to exchange the application layer security key.

In Example 21, the subject matter of any of Examples 12-16 or any of the Examples described herein may further include a baseband processor.

Example 22 is a system of a core network for adding a cellular device to a subscription. The system contains one or more processors configured to receive a Universal Resource Locator (URL) pointer to a device certificate of a device from a user equipment (UE), obtain the device certificate from the URL, verify the device certificate, and derive security credentials from device identifiers to form a master key. The one or more processors can further determine a second key to provide a security context between the UE and the device, prepare to attach the device to the network, and generate a message comprising the master key and the second key to transmit to the UE. The one or more processors can also attach the device to the network.

In Example 23, the subject matter of Example 22 or any of the Examples described herein may further include a home subscriber server (HSS) configured to provide the master key, and a mobility management entity (MME) containing at least one or more processors.

In Example 24, the subject matter of Example 23 or any of the Examples described herein may further include a master key derived from a key in the HSS.

In Example 25, the subject matter of Example 22 or any of the Examples described herein may further include the URL containing a device description.

In Example 26, the subject matter of Example 22 or any of the Examples described herein may further include one or more processors configured to receive connection information describing the cellular device and a device certification URL. The one or more processors can further verify the device certificate, exchange an application layer security key with the device, and add the device to an account of a service provider.

In Example 27, the subject matter of any of Examples 22-26 or any of the Examples described herein may further include one or more processors configured to add the device to an account of a network operator.

Example 28 is a system for adding a cellular device to a subscription of a service provider. The system includes one or more processors. The processors are configured to receive connection information describing the cellular device and a device certification URL, verify the device certificate, exchange an application layer security key with the cellular device, and add the cellular device to an account of the service provider.

In Example 29, the subject matter of Example 28 or any of the Examples described herein may further include the URL containing a device description.

In Example 30, the subject matter of Example 28 or any of the Examples described herein may further include exchanging an application layer security key using a Diffie-Hellman procedure.

In Example 31, the subject matter of Example 28 or any of the Examples described herein may further include one or more processors configured to receive a device certification URL of the cellular device from a user equipment (UE), obtain the device certificate from the URL, verify the device certificate, and derive security credentials from device identifiers to form a master key. The one or more processors can further determine a second key to provide a security context between the UE and the cellular device, prepare to attach the cellular device to the network, and generate a message comprising the master key and the second key to transmit to the UE. The one or more processors can also be configured to attach the cellular device to the network.

Example 32 is an apparatus of a cellular device. The apparatus contains a processor. The processor is configured to generate a first attach request message with the Universal Resource Locator (URL) of a certificate of the cellular device and a unique signature for transmission to a cellular network, and receive an attach reject message from the cellular network comprising a master key and identifier. The processor can further be configured to generate a second attach request message based on the master key and identifier, and attach to the network.

In Example 33, the subject matter of Example 32 or any of the Examples described herein may further include a secure element and a wireless interface configured to communicate with a mobile device.

In Example 34, the subject matter of Example 32 or any of the Examples described herein may further include a URL containing data describing the cellular device.

In Example 35, the subject matter of Example 32 or any of the Examples described herein may further include a processor configured to provision the cellular device for a network provider with device, network, and security information.

In Example 36, the subject matter of Example 32 or any of the Examples described herein may further include a processor configured to provision the cellular device for a service provider with the application layer security key.

In Example 37, the subject matter of Example 32 or any of the Examples described herein may further include a processor configured to verify an integrity of the device, whether the device is compliant to a set of standards or whether the device is certified by an entity.

In Example 38, the subject matter of any of Examples 32-37 or any of the Examples described herein may further include a wireless link near field communication (NFC), Bluetooth™ Low Energy, low power Wi-Fi™, or ZigBee™.

In Example 39, the subject matter of any of Examples 32-37 or any of the Examples described herein may further include a cellular device configured to communicate over long term evolution (LTE) narrowband.

In Example 40, the subject matter of any of Examples 32-37 or any of the Examples described herein may further include a processor configured to decrypt the second message with the generated key.

In Example 41, the subject matter of any of Examples 32-37 or any of the Examples described herein may further include exchanging the application layer security key with the service provider and performing a Diffie-Hellman procedure to exchange the application layer security key.

In Example 42, the subject matter of any of Examples 32-37 or any of the Examples described herein may further include a baseband processor.

Example 43 is an apparatus of a user equipment (UE). The apparatus contains a processor. The processor is configured to receive a Universal Resource Locator (URL) for a long term evolution (LTE) device based in part on a code displayed on the LTE device, the URL indicating a device certification. The processor can further be configured to generate a first message with the URL to transmit to a network, receive an encrypted device key from the network, and decrypt the encrypted device key to form a device key, the derived key used for securing communications between the LTE device and the UE. The processor can also be configured to receive an indication to power on the LTE device, generate a second message including a public key of the service provider to provide to the LTE device, and generate a fourth message including LTE device connection information and device certification to transmit to the service provider.

In Example 44, the subject matter of Example 43 or any of the Examples described herein may further include an application configured to communicate with the LTE device.

In Example 45, the subject matter of Example 43 or any of the Examples described herein can optionally be modified wherein generating a message with the URL to transmit to the network, further includes transmitting the first message to a mobility management entity.

In Example 46, the subject matter of Example 43 or any of the Examples described herein may further include a first message containing a service request or a Non-Access Stratum (NAS) Uplink Container.

In Example 47, the subject matter of Example 43 or any of the Examples described herein may further include a URL containing data describing the cellular device.

In Example 48, the subject matter of any of Examples 43-47 or any of the Examples described herein may further include an encrypted key derived from a key in the home subscriber system.

In Example 49, the subject matter of any of Examples 43-47 or any of the Examples described herein may further include a wireless link near field communication (NFC), Bluetooth™ Low Energy, low power Wi-Fi™, or ZigBee™.

In Example 50, the subject matter of any of Examples 43-47 or any of the Examples described herein may further include an LTE device configured to communicate over LTE narrowband.

In Example 51, the subject matter of any of Examples 43-47 or any of the Examples described herein may further include a processor configured to decrypt the second message with the generated key.

In Example 52, the subject matter of any of Examples 43-47 or any of the Examples described herein may further include a baseband processor.

Example 53 is a computer program product. The computer program product includes a computer-readable storage medium. The computer-readable storage medium stores instructions for execution by a processor to perform operations of a Mobility Management Entity (MME). The operations, when executed by the processor, perform a method. The method includes receiving a Universal Resource Locator (URL) pointer to a device certificate of a device from a user equipment (UE), obtaining the device certificate from the URL, verifying the device certificate, and deriving security credentials from device identifiers to form a master key. The method can further include determining a second key to provide a security context between the UE and the device, preparing to attach the device to the network, generating a message comprising the second key to transmit to the UE, and providing an indication to the UE to turn on the device. The method can also include receiving a first attach request message with the URL of a certificate of the cellular device and a unique signature, and generating an attach reject message comprising a master key and identifier to transmit to the device. The method can further include receiving a second attach request message based on the master key and identifier from the device, and attaching the device to the network.

In Example 54, the subject matter of Example 53 or any of the Examples described herein may further include a URL containing a device description.

In Example 55, the subject matter of Example 53 or any of the Examples described herein may further include a method to receive connection information describing the cellular device and a device certification URL, verify the device certificate, exchange an application layer security key with the device, and add the device to an account of a service provider.

In Example 56, the subject matter of Example 53 or any of the Examples described herein may further include a method to add the device to an account of a network operator.

Example 57 is a method of adding a cellular device to a subscription. The method includes receiving a Universal Resource Locator (URL) pointer to a device certificate of a device from a user equipment (UE), obtaining the device certificate from the URL, verifying the device certificate, and deriving security credentials from device identifiers to form a master key. The method can further include determining a second key to provide a security context between the UE and the device, preparing to attach the device to the network, generating a message comprising the second key to transmit to the UE, providing an indication to the UE to turn on the device, and receiving a first attach request message with the URL of a certificate of the cellular device and a unique signature. The method can also include generating an attach reject message comprising a master key and identifier to transmit to the device, receiving a second attach request message based on the master key and identifier from the device, and attaching the device to the network.

In Example 58, the subject matter of Example 57 or any of the Examples described herein may further include a URL containing a device description.

In Example 59, the subject matter of Example 57 or any of the Examples described herein may further include a method to receive connection information describing the cellular device and a device certification URL, verify the device certificate, exchange an application layer security key with the device, and add the device to an account of a service provider.

In Example 60, the subject matter of Example 57 or any of the Examples described herein may further include a method to add the device to an account of a network operator.

Example 61 is a method of adding a cellular device to a subscription. The method includes generating a Uniform Resource Locator (URL) to transmit to a mobile device over a wireless link, the URL indicating a device certification. The method can further include receiving a message that includes an encrypted key from a mobile device over the wireless link, decrypting the encrypted key to form a key, and computing a generated key using a key-deriving function. The method can also include receiving a second message including a public key of a service provider from the mobile device over the wireless link, and exchanging an application layer security key with the service provider.

In Example 62, the subject matter of Example 61 or any of the Examples described herein may further include provisioning the cellular device for a network provider with device, network, and security information.

In Example 63, the subject matter of Example 61 or any of the Examples described herein may further include provisioning the cellular device for a service provider with the application layer security key.

In Example 64, the subject matter of Example 61 or any of the Examples described herein may further include verifying an integrity of the device, whether the device is compliant to a set of standards or whether the device is certified by an entity.

In Example 65, the subject matter of Example 61 or any of the Examples described herein may further include communicating over long term evolution (LTE) narrowband.

In Example 66, the subject matter of Example 61 or any of the Examples described herein may further include decrypting the second message with the generated key.

In Example 67, the subject matter of Example 61 or any of the Examples described herein may further include exchanging the application layer security key with the service provider performing a Diffie-Hellman procedure to exchange the application layer security key.

Example 68 is an apparatus containing a procedure to perform a method as identified in any of Example 57-67.

Example 69 is a machine-readable storage including machine-readable instructions, which when executed, implement a method or realize an apparatus as identified in any of Examples 57-67.

Example 70 is a machine-readable medium including code, which when executed, cause a machine to perform the method of any one of Examples 57-67.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the embodiments are not to be limited to the details given herein, but may be modified within the scope and equivalents of the appended claims.

The invention claimed is:

1. An apparatus of a cellular device, comprising:
 a processor configured to:
  generate a Uniform Resource Locator (URL) to transmit to a user equipment (UE) over a wireless link, the UE associated with a user subscription of a service provider, the URL indicating a device certification of the cellular device;
  in response to the cellular device transmitting the URL to the UE, receive, from the UE over the wireless link, a first message that includes an encrypted network key;
  decrypt the encrypted network key to form a network key;
  generate a device key using the network key with a key-deriving function;
  receive, from the UE over the wireless link, a second message;
  use the device key to decrypt the second message to obtain a public key of the service provider; and
  use the public key to exchange an application layer security key with the service provider to establish a security association between the cellular device and the service provider and to add the cellular device to the user subscription.

2. The apparatus of claim 1, further comprising:
 a secure element configured to store the network key and the device key; and
 a wireless interface configured to communicate with the UE.

3. The apparatus of claim 1, wherein the wireless link is near field communication (NFC), Bluetooth™ Low Energy, low power Wi-Fi™ or ZigBee™.

4. The apparatus of claim 1, wherein the cellular device is configured to communicate over long term evolution (LTE) narrowband.

5. The apparatus of any of claim 1, wherein to exchange the application layer security key with the service provider further comprises performing a Diffie-Hellman procedure to exchange the application layer security key.

6. The apparatus of claim 1, wherein the processor is a baseband processor.

7. An apparatus of a user equipment (UE), comprising:
 a processor configured to:
  receive a Uniform Resource Locator (URL) from a cellular device over a wireless link, the URL indicating a device certification of the cellular device;
  generate a first message with the URL to transmit to a core network;
  receive an encrypted network key and an encrypted device key from the core network;
  decrypt the encrypted network key to form a network key, the network key used for securing communications between the cellular device and the core network to allow the cellular device to access a service provider using a user subscription associated with the UE, wherein the UE has been provisioned with a public key of the service provider;
  decrypt the encrypted device key to form a device key, the device key used for securing communications between the cellular device and the UE;
  generate a second message including the network key to transmit to the cellular device;
  generate a third message using the device key, including the public key of the service provider to provide to the cellular device; and
  generate a fourth message, using the device key, including cellular device connection information and device certification received from the cellular device, to transmit to the service provider to establish a security association between the cellular device and the service provider and to add the cellular device to the user subscription.

8. The apparatus of claim 7, further comprising a wireless interface configured to communicate with the cellular device, and wherein the processor is further configured to execute an application configured to communicate with the cellular device.

9. The apparatus of claim 7, wherein to generate the first message with the URL to transmit to the core network further comprises transmitting the first message to a mobility management entity (MME).

10. The apparatus of claim 7, wherein the first message comprises a service request or a Non-Access Stratum (NAS) Uplink Container.

11. The apparatus of claim 7, wherein the URL further comprises data describing the cellular device.

12. A system of a core network for adding a cellular device to a user subscription of a service provider associated with a user equipment (UE), comprising:
 one or more processors configured to:
  receive a Universal Resource Locator (URL) pointer to a device certificate of the cellular device from the UE;
  obtain the device certificate and device identifiers associated with the cellular device from the URL;
  verify the device certificate;
  derive security credentials from the device identifiers to form a network key;
  determine a device key using the network key with a key derivation function, the device key to provide a security context between the UE and the cellular device;
  prepare to attach the cellular device to the core network;
  generate a message comprising the network key and the device key to transmit to the UE;
  attach the cellular device to the core network; and add the cellular device to an account of a network operator to provide an authorized exchange of an application layer security key between the service provider and the cellular device to establish a security association between the cellular device and the service provider and to add the cellular device to the user subscription.

13. The system of claim 12, further comprising:
a home subscriber server (HSS) configured to provide the master key; and
a mobility management entity (MME) comprising at least one of the one or more processors.

* * * * *